(12) United States Patent
Hillman

(10) Patent No.: US 7,766,372 B2
(45) Date of Patent: Aug. 3, 2010

(54) VEHICLE INSTRUMENT PANEL WITH NONVISIBLE AIRBAG TEAR SEAM AND DEPLOYMENT DOOR AND METHOD OF MAKING THE SAME

(75) Inventor: Heidi M. Hillman, Birmingham, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 174 days.

(21) Appl. No.: 12/137,200

(22) Filed: Jun. 11, 2008

(65) Prior Publication Data

US 2009/0309338 A1    Dec. 17, 2009

(51) Int. Cl.
*B60R 21/205* (2006.01)
(52) U.S. Cl. .................................. 280/728.3
(58) Field of Classification Search ............. 280/728.3, 280/732, 728.2
See application file for complete search history.

(56) References Cited

U.S. PATENT DOCUMENTS

| | | | | |
|---|---|---|---|---|
| 5,437,470 A | * | 8/1995 | Terai et al. ............... | 280/728.3 |
| 5,478,106 A | * | 12/1995 | Bauer et al. ............... | 280/728.3 |
| 6,152,480 A | * | 11/2000 | Iwanaga ................... | 280/728.3 |
| 2002/0074782 A1 | * | 6/2002 | Saito ........................... | 280/732 |
| 2005/0225062 A1 | * | 10/2005 | Dumbrique ............... | 280/728.3 |
| 2006/0214399 A1 | * | 9/2006 | Okamoto et al. .......... | 280/728.3 |
| 2007/0045996 A1 | * | 3/2007 | Frisch ....................... | 280/728.3 |

\* cited by examiner

*Primary Examiner*—Paul N Dickson
*Assistant Examiner*—Joseph Rocca
(74) *Attorney, Agent, or Firm*—Quinn Law Group, PLLC

(57) ABSTRACT

An interior trim panel is provided that is adapted to house a supplemental inflatable restraint (SIR) system when installed in a motorized vehicle. The trim panel includes a rigid substrate configured to attach to the vehicle. The rigid substrate includes opposing inner and outer surfaces, and defines a cavity therein with an opening formed through the inner and outer surfaces. The cavity is configured to nest the SIR system therein. A standing rib protrudes from the rigid substrate outer surface, elongated about at least a portion of the opening. An outer skin is injection molded over the rigid substrate, covering the outer surface and opening. The outer skin includes a reduced thickness portion, formed between an external surface thereof and the standing rib, which is configured to weaken the outer skin such that the inflatable cushion can break therethrough when transitioning from a non-expanded state to an expanded state.

11 Claims, 1 Drawing Sheet

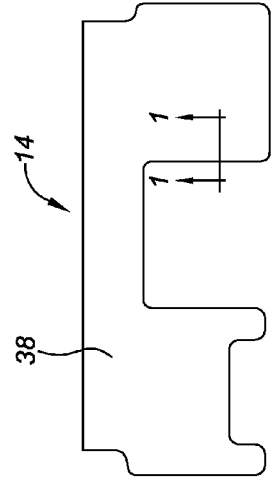
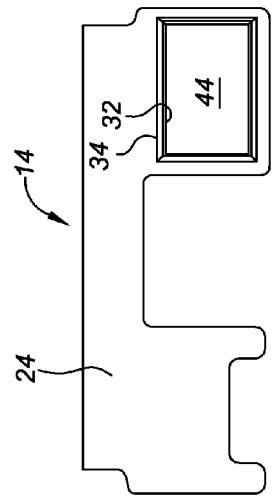
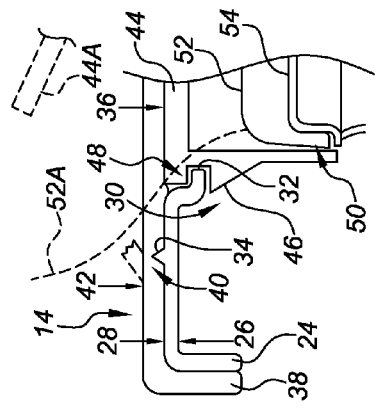
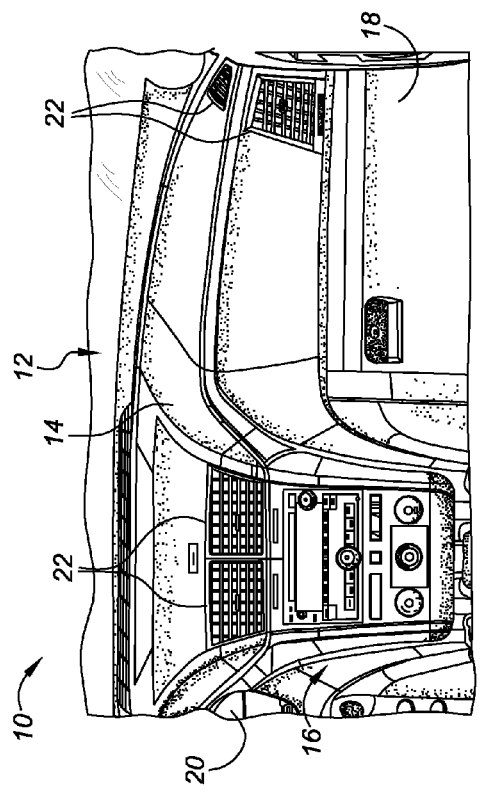

VEHICLE INSTRUMENT PANEL WITH NONVISIBLE AIRBAG TEAR SEAM AND DEPLOYMENT DOOR AND METHOD OF MAKING THE SAME

TECHNICAL FIELD

The present invention relates generally to inflatable restraint systems for motorized vehicles, and more particularly to interior trim panel arrangements having a chamber, deployment opening, and cover for a supplemental inflatable restraint system.

BACKGROUND OF THE INVENTION

Inflatable airbag devices, which are more commonly referred to in the art as Supplementary Restraint Systems (SRS), Air Cushion Restraint Systems (ACRS), or Supplemental Inflatable Restraint (SIR) Systems, are originally equipped in almost all present day automotive vehicles. Included as part of an overall occupant restraint system, airbag devices are generally located in the vehicle passenger compartment, and act as a selectively deployable cushion capable of attenuating occupant kinetic energy. Moreover, airbags are designed to minimize inadvertent movement of the driver and/or other occupants to help avoid involuntary contact with interior portions of the automobile.

Traditional airbag devices comprise an inflatable airbag module stored behind the vehicle instrument panel (e.g., for passenger-side airbags), or mounted to the steering wheel hub (e.g., for driver-side airbags). A plurality of sensors or similar devices is strategically located throughout the vehicle to detect the onset of a predetermined activation event. The sensor(s) responsively activates an inflation device, internally located in the airbag module, to produce a flow of inflating gas into an inflatable flexible membrane (i.e., an airbag cushion), which is normally folded inside of the airbag module. This causes the airbag cushion to deploy in a rearward direction within the vehicle passenger compartment.

Most passenger-side SIR systems are disposed within and behind the instrument panel, which extends across the width of the vehicle's passenger compartment, at the forward most end thereof. The instrument panel may utilize a deployment door (e.g., visible door) to cover an opening formed in the instrument panel for the airbag cushion to deploy through. The discrete airbag door is designed to open in response to the force of the expanding airbag cushion. That is, as the pressure in the airbag cushion increases, a force is generated along an underside surface of the discrete door. At least a portion of the door then selectively separates from the remaining portion of the instrument panel to permit the airbag cushion to deploy through the opening in the instrument panel, into the vehicle passenger compartment.

Generally, a vehicle instrument panel comprises a plurality of layers, which may include a rigid substrate, an aesthetic cover, and an optional foam layer therebetween. Conventional methods of manufacturing a vehicle instrument panel involve multiple separate forming and manufacturing process steps depending upon the instrument panel construction required. First the instrument panel is formed to accommodate, among other things, the size and shape of the SIR system. In the interim, the discrete door is formed in a separate process. Finally, the discrete door is assembled onto the instrument panel for use in conjunction with the SIR system. The steps involved in the manufacture of a conventional instrument panel consume substantial time and resources, and result in an aesthetically apparent (e.g., visible) airbag door.

SUMMARY OF THE INVENTION

According to one embodiment of the present invention, an interior trim panel is provided that is adapted, at least in part, to house a supplemental inflatable restraint (SIR) system when installed in a motorized vehicle. The trim panel includes a rigid substrate configured to attach to the vehicle. The rigid substrate has opposing inner and outer surfaces, and defines a cavity with an opening formed through the inner and outer surfaces. The cavity is configured to nest the supplemental inflatable restraint system therein. The rigid substrate includes a standing rib that protrudes from the outer surface, extending around at least a portion of the opening. An outer skin is attached to the rigid substrate, covering the opening and at least a portion of the outer surface. The outer skin includes a reduced thickness portion formed between an external surface thereof and the standing rib. The reduced thickness portion is configured to weaken the outer skin at preselected locations such that the inflatable cushion of the SIR system can selectively deploy therethrough.

According to one aspect of this embodiment, a closeout door is attached to the rigid substrate, and configured to transition from a first, substantially closed position to a second, generally open position. The closeout door, when in the first position, is positioned underneath the outer skin, spanning substantially the entirety of the opening. Desirably, the closeout door includes one or more snap fasteners oriented along an outer peripheral edge thereof. Each snap fastener is configured to mate with the rigid substrate and thereby retain the closeout door in the first position. In this instance, the rigid substrate preferably includes a stepped region extending inward from at least a portion of the inner peripheral edge of the opening. The snap fasteners mate with the stepped region such that the closeout door, when in the first position, is substantially flush with the outer surface of the rigid substrate.

In accordance with another aspect, the rigid substrate is a thermoplastic olefin, whereas the outer skin is preferably a thermoplastic elastomer.

According to yet another aspect, the standing rib extends around the opening in a continuous manner.

In accordance with another embodiment of the present invention, a motorized vehicle is provided. The vehicle includes an instrument panel positioned at a forward end of the passenger compartment. The instrument panel includes a rigid substrate with opposing inner and outer surfaces. The rigid substrate defines a cavity with an opening formed through the inner and outer surfaces. The rigid substrate also includes a standing rib that protrudes from the outer surface, extending around at least a portion of the opening.

An outer skin is attached to the rigid substrate, covering substantially all of the outer surface and the opening. The outer skin includes a reduced thickness portion that is formed by the area between an external surface thereof and the standing rib. A closeout door is operatively attached to the rigid substrate, underneath the outer skin. The closeout door is configured to transition from a substantially closed position to a generally open position. Ideally, the closeout door spans substantially the entirety of, and thereby obstructs the opening in the rigid substrate when in said first position.

The vehicle also includes an inflatable cushion that is operable to transition through the opening in the instrument panel from a non-expanded state, in which the cushion is nested inside the cavity, to an expanded state, in which the cushion is substantially outside the cavity. A fluid dispensing apparatus is in fluid communication with the cushion. The fluid dispensing apparatus is operable to regulate the selective transition of the cushion from the non-expanded state to the expanded state. The reduced thickness portion is configured to weaken the outer skin at preselected locations such that the inflatable cushion can break therethrough when transitioning from the non-expanded state to the expanded state.

According to another embodiment of the present invention, a method of manufacturing an instrument panel that is adapted to house an airbag device when installed in a motorized vehicle is provided. The method includes first forming a rigid substrate that has opposing inner and outer surfaces, and defines a cavity with an opening formed through the inner and outer surfaces. The rigid substrate is also formed with a standing rib that protrudes from the outer surface, extending around at least a portion of the opening. Second, a closeout door is attached to the rigid substrate. The closeout door is configured to transition from a substantially closed position to a generally open position. When in the closed position, the closeout door spans substantially the entirety of, and thereby obstructs the opening. Finally, an upper surface of the closeout door and the outer surface of the rigid substrate are covered with an outer skin such that all contours of the closeout door are nonvisible to an occupant seated adjacent to the instrument panel. The outer skin is includes a reduced thickness portion formed between an external surface thereof and the standing rib. The reduced thickness portion is configured to weaken the outer skin at preselected locations such that the inflatable cushion can selectively deploy therethrough.

According to one aspect of this embodiment, forming the rigid substrate includes injection molding the rigid substrate as a single-piece structure.

According to another aspect of this embodiment, covering the closeout door and rigid substrate includes injection molding the outer skin over both the closeout door and the rigid substrate.

In accordance with yet another aspect, the rigid substrate is a thermoplastic olefin, whereas the outer skin is a thermoplastic elastomer.

The above features and advantages, and other features and advantages of the present invention, will be readily apparent from the following detailed description of the preferred embodiments and best modes for carrying out the present invention when taken in connection with the accompanying drawings and appended claims.

BRIEF DESCRIPTION OF THE DRAWINGS

FIG. 1 is a perspective-view illustration inside of the passenger compartment of a representative motorized vehicle depicting a vehicle instrument panel in accordance with a preferred embodiment of the present invention;

FIG. 2A is a schematic plan-view illustration of the vehicle instrument panel of FIG. 1 with the outer skin removed to show the rigid substrate with a discrete deployment door operatively attached thereto;

FIG. 2B a schematic plan-view illustration of the instrument panel of FIG. 2A with the outer skin covering the rigid substrate and discrete deployment door; and FIG. 2C is a schematic side cross-sectional illustration of a portion of the instrument panel from FIG. 2B taken along line 1-1.

DESCRIPTION OF THE PREFERRED EMBODIMENTS

Referring to the drawings, wherein like reference numbers refer to like components throughout the several views, FIG. 1 is a perspective-view illustration of the forward portion of a passenger compartment in a representative motorized vehicle, identified generally as 10, with which the present invention may be incorporated and utilized. It should be readily understood that FIG. 1 is merely an exemplary application by which the present invention may be practiced. As such, the present invention is by no means limited to the particular structure or arrangement presented in FIG. 1. By way of example, and not limitation, the interior trim panels of the present invention can be incorporated into any motorized vehicle, such as coupe- or sedan-type passenger cars, light trucks, sport utility vehicles, heavy duty vehicles, vans, buses, airplanes, trains, etc. In addition, the drawings presented herein are not to scale, and are provided purely for instructional purposes. Thus, the individual and relative dimensions shown in the drawings are not to be considered limiting. Finally, it should be readily appreciated that the adjectives used to specify spatial relationships (e.g., forward, rearward, horizontal, vertical, rear, front) indicate spatial relationships as they exist when located in their intended orientation with the automobile.

The vehicle 10 includes an interior compartment, such as passenger compartment 12, having vehicle interior structure, which is represented collectively herein by an instrument panel 14 (also known as a "dashboard" or "fascia"), a center console 16, and a glove compartment (or "glove box") 18 of conventional design. The instrument panel 14 extends transversely across the vehicle 10, at a forward end of the passenger compartment 12. The instrument panel 14 is configured to house various switches, accessories, and instrumentation, including, for example at the driver side, an electronic instrument cluster 20 with various digital or analog gauges—e.g., speedometer, odometer, and tachometer (none of which are visible in the drawings), or, at the front passenger side, heating, ventilation, and air conditioning (HVAC) vents 22 and the glove compartment 18. The center console 16 originates at the instrument panel 14, and continues beneath it, running rearward in the passenger compartment 12 between front driver and passenger seat assemblies (not shown).

The instrument panel 14 (which is also referred to herein as "interior trim panel") is designed to cover or conceal various underlying components when installed in the motorized vehicle 10. For instance, the instrument panel 14 overlies a plurality of HVAC ducts (not shown), assorted wiring harnesses (not shown), and one or more supplemental inflatable restraint systems, such as a passenger-side airbag device shown in FIG. 2C (indicated generally at 50).

The instrument panel 14 includes a rigid substrate 24, depicted schematically in FIG. 2A, that is configured to attach to the vehicle 10 (e.g., via heat stakes, fasteners, bolts, or other mechanical attachment means). As will be explained below, the rigid substrate 24 is preferably preformed as a single-piece, continuous structure that is fabricated from a material known to have sufficient strength and structural resiliency for the intended use of the instrument panel 14, such as polycarbonate or polypropylene, but preferably an injection moldable structural plastic such as thermoplastic olefin (TPO).

The rigid substrate 24, as seen in FIG. 2C, has opposing inner and outer surfaces 26 and 28, respectively, and defines a cavity, indicated generally as 30, with an opening or deployment port 32 that is formed through the inner and outer surfaces 26, 28, facing in a generally rearward direction relative to the vehicle 10. The cavity 30 extends generally downward and forward into an internal hollow of the instrument panel 14, and is configured to nest the supplemental inflatable restraint system (airbag device 50) therein. The rigid substrate 24 also includes a standing rib or wall 34 that protrudes from the outer surface 28, elongated about or spanning around the opening 32 in a preferably continuous or uninterrupted manner to meet performance criteria. Although shown with a simple triangular profile, it is envisioned that the standing rib 34 take on additional shapes and dimensions without departing from the scope and spirit of the present invention.

The airbag device 50 includes an inflatable cushion or flexible membrane 52 that is in fluid communication with an inflation fluid dispensing apparatus or inflator 54, both of which are shown operatively oriented within the cavity 30 in FIG. 2C. The inflation fluid dispensing apparatus 54 acts as a pressure vessel, used to store and discharge inflation gas. That is, the inflation fluid dispensing apparatus 54 is selectively actuable to provide a fluid, preferably in the nature of a pressurized gas such as nitrogen, argon, or carbon dioxide, for deploying the cushion 52 outward into the interior compartment 12 of FIG. 1. For example, the inflatable cushion 52 is shown in a first, non-expanded deflated state in FIG. 2C, wherein the inflatable cushion 52 is inside the cavity 30 in a generally folded condition. Upon actuation of the inflation fluid dispensing apparatus 54, the inflatable cushion 52 transitions through the opening 32 in the instrument panel 14 to a second, expanded state (indicated with hidden lines at 52A in FIG. 2C), in which the inflatable cushion 52 is substantially outside the cavity 30 in an inflated condition.

With reference now to both FIGS. 2B and 2C, an outer skin 38 is injection molded over the rigid substrate 24, spanning coextensive with and covering substantially all of the outer surface 28, standing rib 34, and opening 32. The outer skin 38 is preferably formed as a single, continuous structure, and is intended to provide a generally smooth and aesthetically pleasing show surface, including integrally formed curvatures and apertures. It should be appreciated that although the outer skin 38 is preferably a thermoplastic elastomer, it can be fabricated from other lightweight, flexible injection moldable materials.

The outer skin 38 includes a reduced thickness portion, identified generally by reference numeral 40 in FIG. 2C. The reduced thickness portion 40 is formed between an external surface 42 of the outer skin 38 and the standing rib 34 protruding from the outer surface 28 of the rigid substrate 24. That is, when the outer surface 28 of the rigid substrate 24 is overmolded with the outer skin 38, the standing rib 34 will create a local reduction in material thickness. The reduced thickness portion 40 is configured to weaken the outer skin 38 at preselected locations such that the inflatable cushion 52 of the SIR system 50 can selectively deploy therethrough. Put another way, the reduced thickness portion 40 creates a weakened, frangible area generally of reduced thickness (e.g., relative to the remainder of the outer skin 38) that will tear and/or rupture under the pressure of the inflatable cushion 52 when transitioning to the expanded state 52A.

According to the preferred embodiment of FIGS. 2A-2C, the instrument panel 14 includes a closeout door 44 (also referred to as a "discrete deployment door"), preferably of sufficient length and width to cover and obstruct the opening 32, and conceal the stowed cushion 52. The closeout door 44 is shown in FIGS. 2A and 2C in a first, substantially closed position, oriented underneath the outer skin 38. The closeout door 44 includes a plurality of snap fasteners 46 (only one of which is visible in the drawings) oriented along an outer peripheral edge thereof. Each snap fastener 46 is configured to mate with the rigid substrate 24 and thereby temporarily retain the closeout door 44 in the first position. Specifically, the rigid substrate 24 preferably includes a stepped region 48 that extends inward from at least a portion of the inner peripheral edge of the opening 32. When the closeout door 44 is forced into the opening 32, each snap fastener 46 is pressed against, and snap fit with a respective portion of the stepped region 48 such that the closeout door 44, when in the first position, is secured to the rigid substrate 24, oriented in a substantially flush manner with the outer surface 28.

The closeout door 44 is configured to transition from the first, substantially closed position to a second, generally open position, the latter of which is shown with hidden lines in FIG. 2C at 44A. More specifically, upon inflation of the inflatable cushion 52 to the expanded state 52A, the closeout door 44 is pushed, pressed, or forced to the second, generally open position 44A under the inflation pressure of the expanding cushion. For example, as the cushion 52 inflates, a force will tend to build up along the underside of the closeout door 44 until the outer skin 38 tears along the reduced thickness portion 40, allowing the closeout door 44 to open by its designed mechanism or feature. The cushion 52 will then push through the closeout door 44, expand through opening 32, and into the passenger compartment 12.

According to another embodiment of the present invention, a method of manufacturing an instrument panel that is adapted to house an airbag device therein when installed in a motorized vehicle is provided. The method preferably includes at least those steps indicated below. However, it is within the scope and spirit of the present invention to omit steps, include additional steps, and/or modify the order of steps presented herein. The method includes first forming the rigid substrate 24 with a cavity 30 having an opening 32 formed through the inner and outer surfaces 26, 28. The rigid substrate 24 is also formed with the standing rib 34 that protrudes from the outer surface 28, elongated about at least a portion of the opening 32. The rigid substrate 24 is preferably injection molded from a thermoset olefin as a single-piece structure.

The method then includes attaching the closeout door 44 to the rigid substrate 24 in an operative manner. That is, the closeout door 44 is affixed to the rigid substrate 24, as explained hereinabove, to transition from a substantially closed position to a generally open position. In addition, the closeout door 44 should be positioned to seal the opening 32 when in the closed position. Finally, an upper surface 36 of the closeout door 44 and the outer surface 28 of the rigid substrate 24 are covered with the outer skin 38 such that all contours of the closeout door 44 are nonvisible to an occupant seated adjacent to the instrument panel 14 (as seen in FIG. 1). As explained above, when the outer skin 38 is injection molded, covering over the rigid substrate 24 and closeout door 44, the reduced thickness portion 40 is created when molding over the standing rib 34. The reduced thickness portion 40 is configured to weaken the outer skin 38 at preselected locations such that the inflatable cushion 52 of the airbag device 50 can selectively deploy therethrough.

While the best modes for carrying out the present invention have been described in detail herein, those familiar with the art to which this invention pertains will recognize various alternative designs and embodiments for practicing the invention within the scope of the appended claims.

The invention claimed is:

1. An interior trim panel adapted at least in part to house a supplemental inflatable restraint system when installed in a motorized vehicle, the supplemental inflatable restraint system including an inflatable cushion, the trim panel comprising:
   a rigid substrate configured to attach to the vehicle and having opposing inner and outer surfaces, said rigid substrate defining a cavity with an opening formed through said inner and outer surfaces, said cavity configured to nest the supplemental inflatable restraint system therein, said rigid substrate including a standing rib protruding from said outer surface and extending around at least a portion of said opening; and
   an outer skin operatively attached to said rigid substrate and covering said opening and at least a portion of said outer surface, wherein said outer skin includes a reduced thickness portion formed between an external surface thereof and said standing rib, said reduced thickness portion forms a weakened area of said outer skin at preselected locations, and is thereby configured for the inflatable cushion to selectively deploy therethrough;
   a closeout door operatively attached to said rigid substrate and configured to transition from a first substantially closed position to a second generally open position, wherein:
      said closeout door is positioned underneath said outer skin spanning substantially the entirety of said opening when in said first position,
      said closeout door includes one or more snap fasteners oriented along an outer peripheral edge thereof, each of said snap fasteners being configured to mate with said rigid substrate and thereby retain said closeout door in said first position; and
      each of said snap fasteners being configured to transfer during said selective deployment an inflation pressure from said inflatable cushion to said rigid substrate to thereby tear said outer skin alone: said reduced thickness portion.

2. The trim panel of claim 1, wherein said rigid substrate includes a stepped region extending inward from at least a portion of an inner peripheral edge of said opening, and wherein said snap fasteners mate with said stepped region such that said closeout door is substantially flush with said outer surface of said rigid substrate.

3. The trim panel of claim 1, wherein said rigid substrate is a thermoplastic olefin.

4. The trim panel of claim 1, wherein said outer skin is a thermoplastic elastomer.

5. The trim panel of claim 1, wherein said standing rib extends around said opening in a continuous or uninterrupted manner.

6. A motorized vehicle having a passenger compartment, comprising:
   an instrument panel operatively oriented at a forward end of the passenger compartment, said instrument panel including:
   a rigid substrate having opposing inner and outer surfaces and defining a cavity with an opening formed through said inner and outer surfaces, said rigid substrate including a standing rib protruding from said outer surface and extending around at least a portion of said opening;
   an outer skin operatively attached to said rigid substrate and covering substantially all of said outer surface and said opening, wherein said outer skin includes a reduced thickness portion formed between an external surface thereof and said standing rib; and
   a closeout door operatively attached to said rigid substrate underneath said outer skin, said closeout door configured to transition from a first substantially closed position to a second generally open position;
   an inflatable cushion operable to transition through said opening from a non-expanded state, in which said cushion is nested inside said cavity, to an expanded state, in which said cushion is substantially outside said cavity; and
   a fluid dispensing apparatus in fluid communication with said cushion and operable to regulate the selective transition of said cushion from said non-expanded state to said expanded state;
   wherein;
      said reduced thickness portion forms a weakened area of said outer skin at preselected locations, and is thereby configured for said inflatable cushion to break therethrough when transitioning from said non-expanded state to said expanded state;
      said closeout door spans substantially the entirety of and thereby obstructs said opening when in said first position;
      said closeout door includes one or more snap fasteners oriented along; an outer peripheral edge thereof, each of said snap fasteners being configured to mate with said rigid substrate and thereby temporarily retain said closeout door in said first position: and
      each of said snap fasteners being configured to transfer during said transition from said non-expanded state to said expanded state an inflation pressure from said inflatable cushion to said rigid substrate to thereby tear said outer skin along said reduced thickness portion.

7. The vehicle of claim 6, wherein said rigid substrate defines a stepped region extending inward from at least a portion of an inner peripheral edge of said opening, and wherein said snap fasteners mate with said stepped region such that said closeout door is substantially flush with said outer surface of said rigid substrate.

8. The vehicle of claim 7, wherein said inflatable cushion is operable to urge said closeout door from said first position to said second position when transitioning from said non-expanded state to said expanded state.

9. The vehicle of claim 6, wherein said rigid substrate is a thermoplastic olefin.

10. The vehicle of claim 9, wherein said outer skin is a thermoplastic elastomer.

11. The vehicle of claim 6, wherein said standing rib extends around said opening in a continuous manner.

* * * * *